United States Patent [19]

Purens

[11] Patent Number: 5,024,415
[45] Date of Patent: Jun. 18, 1991

[54] TILT AND SWIVEL APPARATUS FOR A DISPLAY MONITOR

[75] Inventor: Alfred Purens, Chicago, Ill.

[73] Assignee: AT&T Bell Laboratories, Murray Hill, N.J.

[21] Appl. No.: 429,239

[22] Filed: Oct. 30, 1989

[51] Int. Cl.⁵ .......................................... F16M 13/00
[52] U.S. Cl. .................................. 248/923; 248/179; 248/371; 248/349
[58] Field of Search .................... 248/179, 371, 372.1, 248/917, 922, 923, 181, 183, 349, 919, 920, 921

[56] References Cited

U.S. PATENT DOCUMENTS

| | | | |
|---|---|---|---|
| 4,304,385 | 12/1981 | Farouche et al. | 248/410 |
| 4,365,779 | 12/1982 | Bates et al. | 248/371 |
| 4,471,931 | 9/1984 | Covey et al. | 248/125 |
| 4,473,206 | 9/1984 | Stillinger | 248/371 |
| 4,494,720 | 1/1985 | Gregory et al. | 248/371 |
| 4,554,590 | 11/1985 | Chelin et al. | 248/183 X |
| 4,564,166 | 1/1986 | Craft et al. | 248/349 |
| 4,570,892 | 2/1986 | Czech et al. | 248/183 X |
| 4,589,713 | 5/1986 | Pfuhl et al. | 248/349 X |
| 4,591,120 | 5/1986 | Bryant-Jeffries et al. | 248/349 X |
| 4,621,782 | 11/1986 | Carlson et al. | 248/183 |
| 4,645,153 | 2/1987 | Granzow et al. | 248/371 X |
| 4,738,422 | 4/1988 | Matheson et al. | 248/349 X |
| 4,852,830 | 8/1989 | Howard et al. | 248/183 |

*Primary Examiner*—Alvin C. Chin-Shue
*Attorney, Agent, or Firm*—D. A. Marshall

[57] ABSTRACT

Apparatus is disclosed for mounting a display monitor on a base and for permitting and limiting the extent of tilting and rotating of the monitor. The apparatus is made up of a spherical projection extending from the bottom of the monitor and a cavity formed in the base for accommodating the spherical projection. A collar surrounds the cavity and has an annular groove for slidably accommodating a swivel ring therein. The ring and the spherical projection have mating surfaces permitting tilting of the monitor. Projecting from the top of the swivel ring are lugs for engaging slots in the spherical projection such that when the monitor rotates, the lugs in the slots force the swivel ring to rotate with the spherical projection. A pair of swivel stops extending from a side of the groove engage a tooth extending from the swivel ring, limiting the extent of rotation of the swivel ring in the groove.

The monitor and base are connected through a key and lock arrangement which includes a lock in the spherical projection of a size and shape to communicate with a key in the base to control the extent of tilting of the monitor. The key and lock arrangement requires that the monitor be rotated past a swivel stop to a predetermined position with respect to the base before it can be removed from the base. To prevent rotation of the ring past the swivel stop, the tooth is mounted on a flexible portion of the ring and an opening in the collar allows access to the flexible section for moving the section away from the swivel stop, allowing the tooth to clear the stop and the swivel ring to rotate past it to the predetermined position, permitting removal of the monitor from the base.

11 Claims, 5 Drawing Sheets

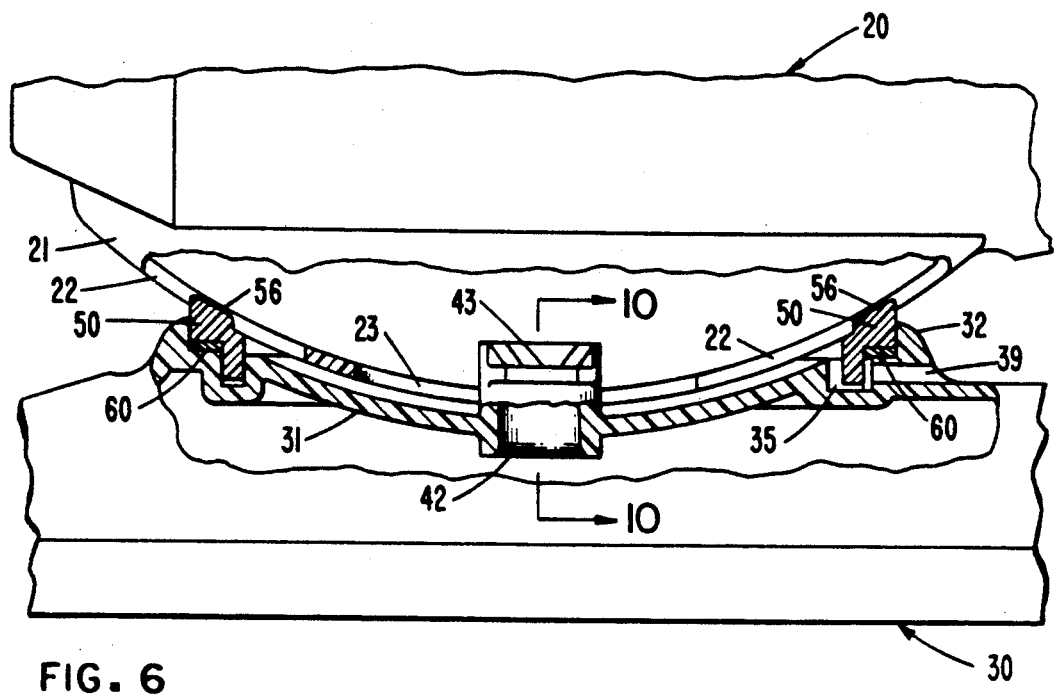
FIG. 6
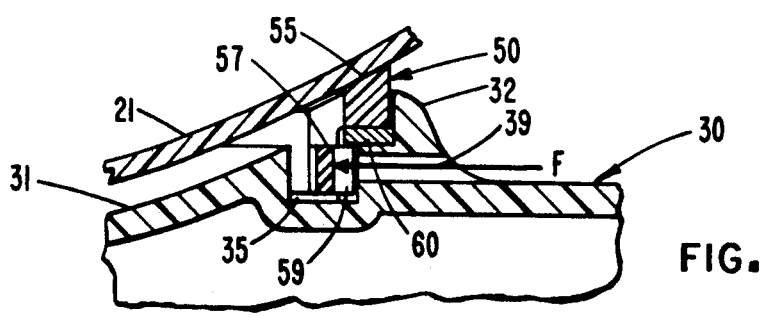
FIG. 7
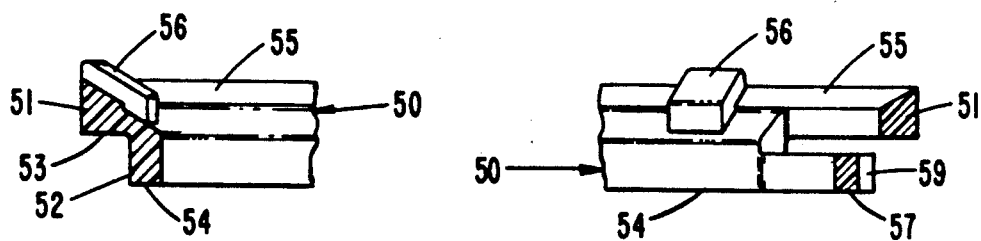
FIG. 8
FIG. 9

TILT AND SWIVEL APPARATUS FOR A DISPLAY MONITOR

TECHNICAL FIELD

This invention relates to apparatus for positioning a display monitor and more specifically to a tilt and swivel apparatus connecting a display monitor to a base or stand.

BACKGROUND OF THE INVENTION

In the office place of today there is a growing use of video display monitors. Many arrangements have been used to allow these video display monitors to be mounted so that the display monitor can be tilted back and forth to minimize glare. Examples of such mounting arrangements are shown and described in U.S. Pat. Nos. 4,471,931 and 4,621,782. In addition to providing a tilting feature, some mounting arrangements also allow for the swiveling/rotation of the display monitors. One such example of prior art arrangement involving a ball and socket type of mounting arrangement is shown in U.S. Pat. No. 4,304,385. While the ball and socket combination works quite well to provide tilt and swivel functions in video monitors having conventional CRT screens, a problem arises when the CRT screen on the monitor is also a touch screen. The present state of the art ball and socket type tilt and swivel mechanisms usually rely on frictional forces developed between the ball and socket surfaces in contact with each other to maintain the monitor at a desired tilt angle and rotational position.

The center of gravity of a monitor is usually not at, or directly above its pivot point in the positioning apparatus, and gravity, therefore, exerts a torque on the monitor tending to change its tilt angle. The frictional forces between the ball and the socket must be sufficiently large to overcome this torque. To tilt the monitor, a force is required to overcome this frictional force between the ball and the socket, and in addition, to overcome the monitor's moment of inertia. Similarly, to swivel the monitor, a force is required to overcome a frictional force and the monitor's moment of inertia, however, the force needed to swivel the monitor is much less than the force required to tilt it. This is due to the fact that the swivel action has a greater mechanical advantage than the tilt action (the mechanics of the forces involved and the moments they produce differ substantially in the two cases).

While in a monitor equipped with a conventional CRT screen this differential between the two forces causes no appreciable problems. When the monitor is equipped with a touch screen and the operator has to push against the screen to communicate with the terminal, unwanted swiveling action may take place requiring corrective action. One obvious way to remedy this is to increase the friction between the mating surfaces of the ball and socket to the point that unwanted swiveling is eliminated. This increases the tilt force to an undesirable level, however, and it may even cause the monitor and its base to lift in front (or back) instead of tilting.

Accordingly, while the ball and socket type mounting arrangement appears to be most desirable from the point of simple design and low cost of manufacturing and assembly, it does not offer a satisfactory arrangement for adjusting the tilt and swivel angles on monitors equipped with touch screens.

SUMMARY OF THE INVENTION

In accordance with the invention, apparatus is provided for mounting a display monitor on a base and for permitting and limiting the extent of tilting and rotating of the monitor and for making the frictional resistances for the tilting and swiveling actions independent of each other. The apparatus is made up of a spherical projection extending from the bottom of the monitor and a cavity formed in the base for accommodating the spherical projection. A collar surrounding the cavity has an annular groove for slidably accommodating a swivel ring therein. The spherical projection of the monitor is seated on the swivel ring. Projecting from the top of the swivel ring are lugs for engaging slots in the spherical projection. When the monitor is tilted, the slots aligned in the tilt direction allow the ring to remain stationary. When the monitor rotates, the lugs in the slots force the swivel ring to rotate with the spherical projection. A pair of swivel stops extending from a side of the groove engage a tooth extending from the swivel ring, limiting the extent of rotation of the swivel ring in the groove.

The monitor and base are connected through a key and lock arrangement which includes a lock in the spherical projection of a size and shape to communicate with a key in the base. The key and lock also control the extent of tilting of the monitor. The key and lock arrangement requires that the monitor be rotated past a swivel stop to a position where the lock lines up with the key before it can be removed from the base. To permit rotation of the ring past the swivel stop, the tooth is mounted on a flexible portion of the ring and an opening in the collar allows access to the flexible section for moving the section away from the swivel stop, allowing the tooth to clear the stop and the swivel ring to rotate past it.

BRIEF DESCRIPTION OF THE DRAWING

FIG. 6 is a partial, cross-sectional view of the apparatus taken along line 6—6 of FIG. 4.

FIG. 7 is an enlarged, segmented view of the access opening for the unlocking of the swivel ring.

FIG. 8 is a detailed, cross-sectional, segmented view of the swivel ring taken along line 8—8 of FIG. 3, showing a lug.

FIG. 9 is a detailed, cross-sectional, segmented view of the swivel ring taken along line 9—9 of FIG. 3.

DETAILED DESCRIPTION

Figure 1:
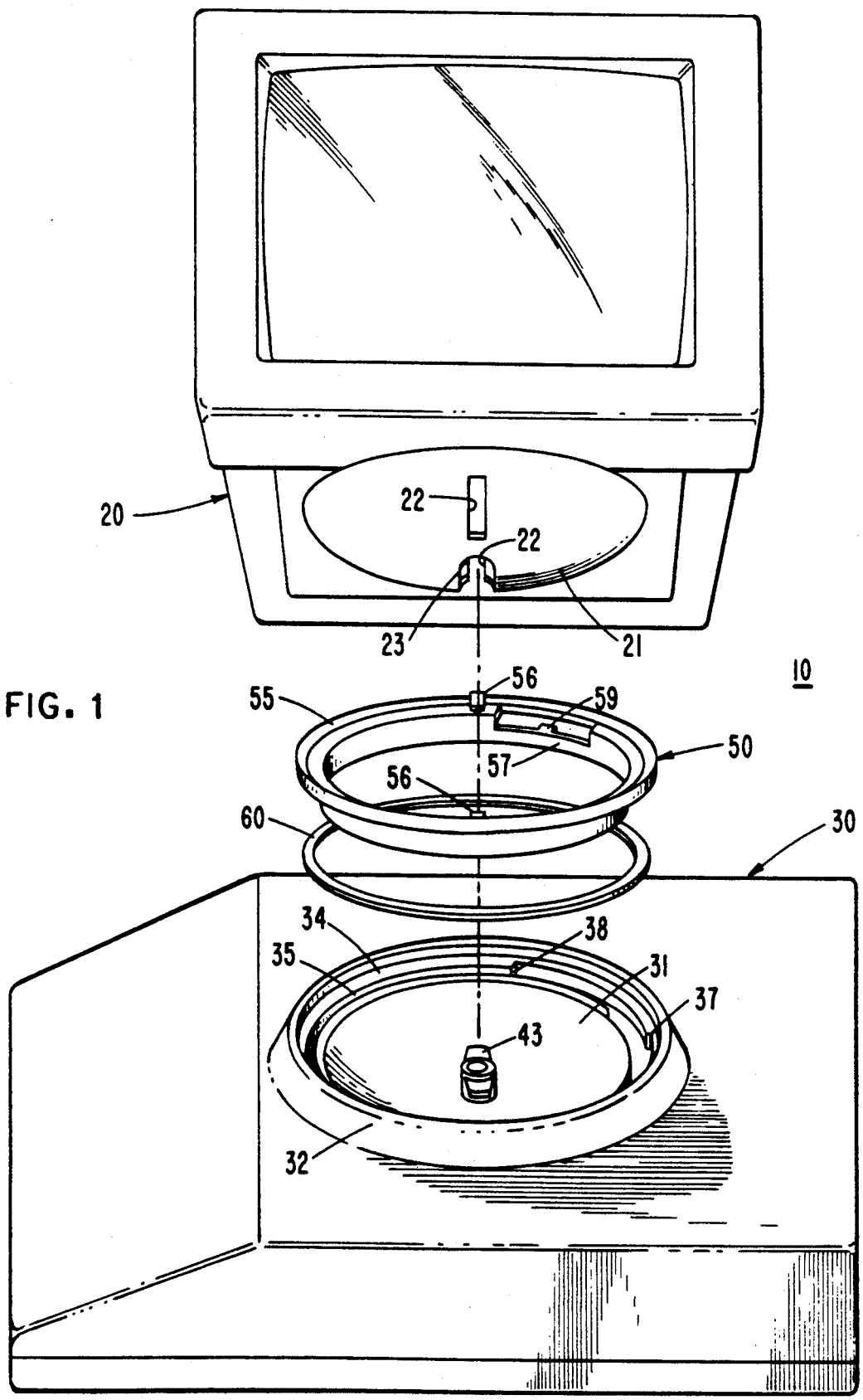
FIG. 1 is an exploded, perspective view illustrating the monitor having a spherical surface extending from its bottom portion, the base upon which the monitor is mounted and the mounting apparatus.

Referring now to the drawing in detail, and specifically to FIG. 1, there is shown an exploded, perspective view of a video display terminal 10 having a display monitor, generally designated by reference numeral 20, and a base, generally designated by reference numeral 30. The base 30 serves as a stand for the display monitor 20 and houses the terminal's electronics (not shown). Enclosures for the monitor 20 and the base 30 may be molded from plastic material.

Apparatus for mounting the monitor 20 on base 30 and permitting and limiting the extent of tilting and swiveling of the monitor 20 includes a convex, generally spherical surface 21 extending from the bottom of the monitor 20. The surface 21 serves as a ball for mating with a socket 31, which is formed in the base 30. Extending from the base 30, and surrounding the socket 31, is a collar 32. Collar 32 has a two step groove 33 which includes an upper flat surface 34 and a lower flat surface 35. A cross-sectional view of the groove 33 is shown in FIG. 7.

The groove 33 is arranged to accommodate a friction ring 60, which may be molded from a plastic material. The friction ring 60 has a substantially rectangular cross-sectional area, as shown in FIG. 7, and is located in groove 33 on the flat surface 34. The function of the friction ring 60 will be discussed later on.

Figure 3:
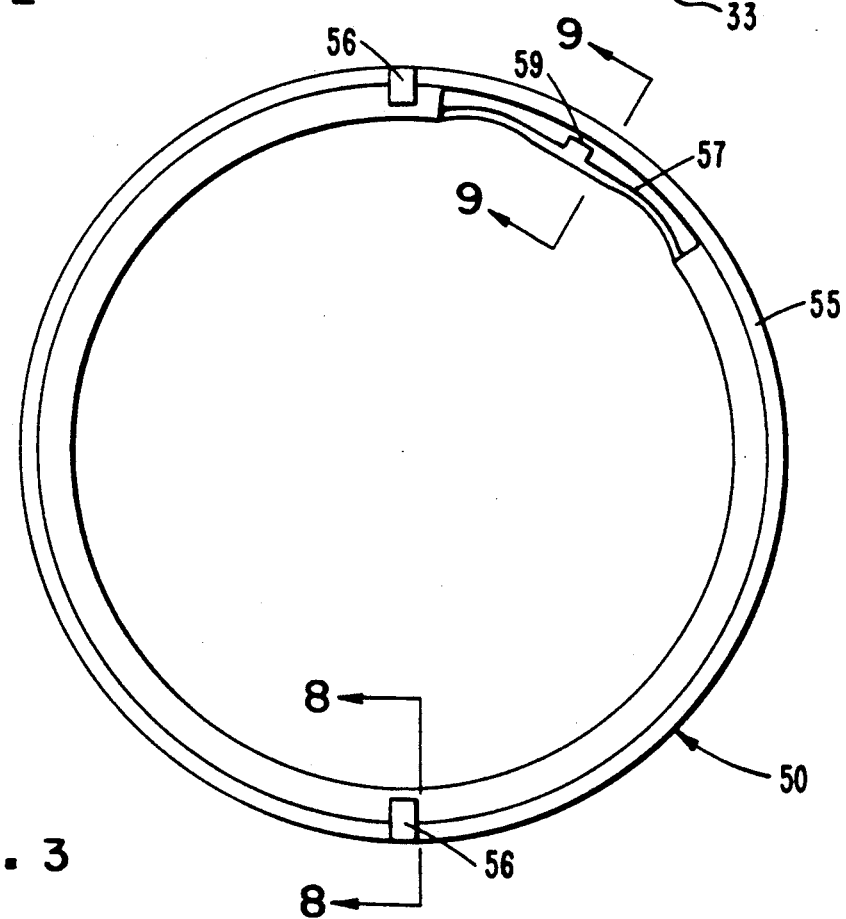
FIG. 3 is a top plan view of the swivel ring shown in FIG. 1.

Groove 33 is further arranged to accommodate a swivel ring 50, a top view of which is shown in FIG. 3. The swivel ring 50 may be molded from a polycarbonate material and is made up of a top portion 51 and a bottom portion 52, as best shown in a cross-sectional view in FIG. 8. Portion 51 has a flat bottom surface 53, which seats on top of the friction ring 60 and portion 52 has a flat bottom surface 54 which clears the flat surface 35 of groove 33. When the monitor is swiveled, the swivel ring 50 may slide on the friction ring 60, or the friction ring 60 may slide on its seat—surface 34 of groove 33. The magnitude of the swivel friction developed depends upon the materials the mating surfaces are made of, texture of the surfaces, as well as the weight supported by these elements. Friction ring 60 allows an easy and convenient way to change the swivel friction by inserting rings with different frictional properties.

The top surface 55 of portion 51 of the swivel ring is beveled and approximates the spherically contoured surface 21 of monitor 20, when the monitor is placed on top of the base 30. Extending or projecting upwardly from the swivel ring 50 are two projections 56 for engaging slots 22 of the spherical surface 21. The function of slots 22 and projections 56 will be disussed later on.

Additionally, swivel ring 50 has a flexible section 57, which is shown in FIG. 3. The flexible section 57 is constructed by separating the two portions 51 and 52 of the ring 50 by removing material joining the two portions 51 and 52, as shown in FIG. 9. A projection 59 extends from the flexible section 57 radially outward. The projection 59 is used to limit the extent of rotation of the swivel ring 50 in groove 33, and thus the extent of swivel of the monitor.

Figure 2:
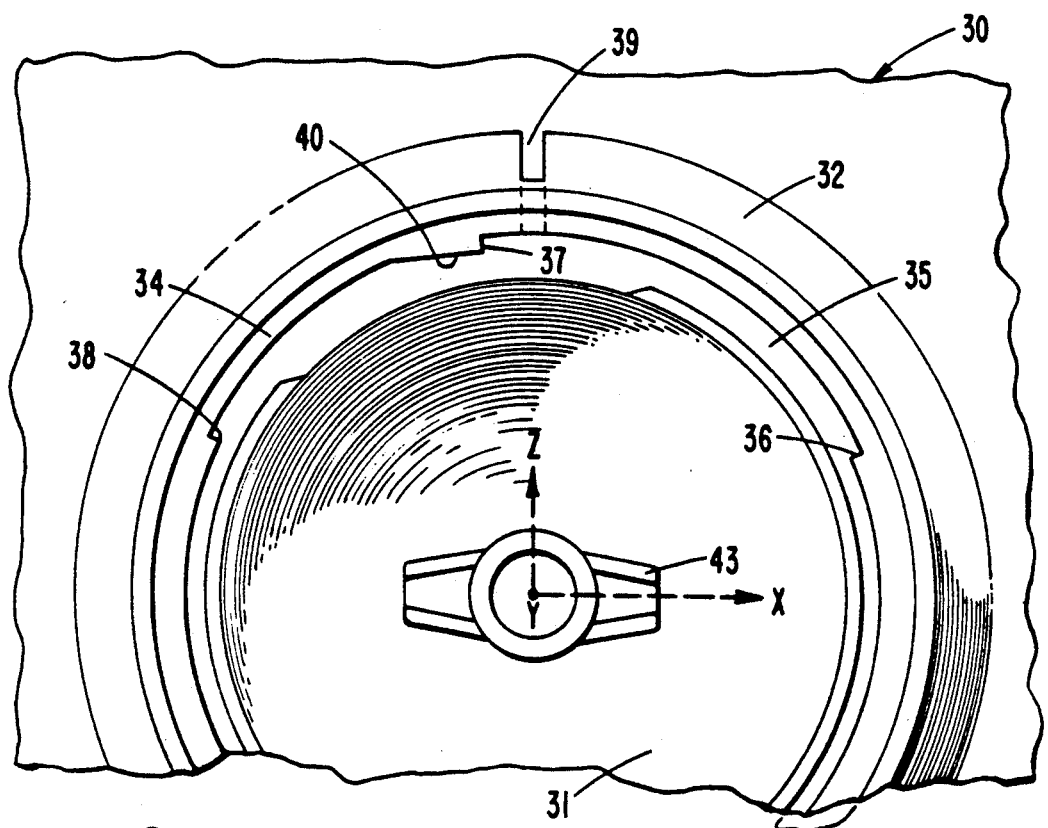
FIG. 2 is a partial top plan view of the base shown in FIG. 1 illustrating a groove for mounting of the friction and swivel rings shown in FIG. 1.

A section of the swivel ring groove 33 is arranged to accommodate the projection 59. As best shown in FIG. 2, two portions of the groove 33 associated with surface 34 are recessed, creating swivel stops 36 through 38. When the monitor is swiveled, the projection 59 moves in the recess between stops 36 and 37, which determine the extent of left and right swivel, respectively. When projection 59 is made to clear stop 37, and is rotated to stop 38, the monitor 20 can be removed from the base 30.

Figure 4:
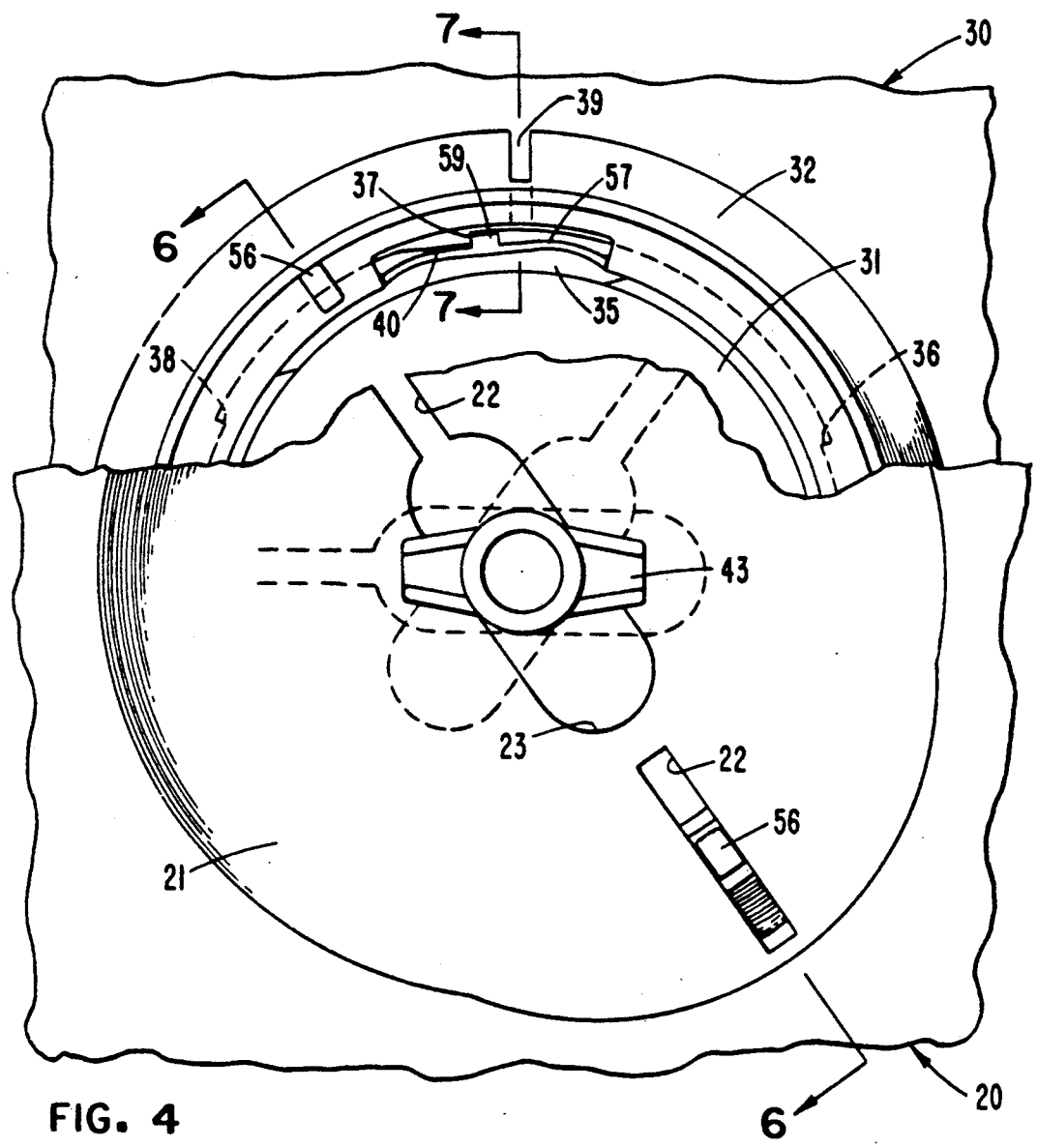
FIG. 4 is a partial top plan view of the apparatus showing the base, bottom portion of the monitor and the swivel ring in place in the groove located in the base.
Figure 5:
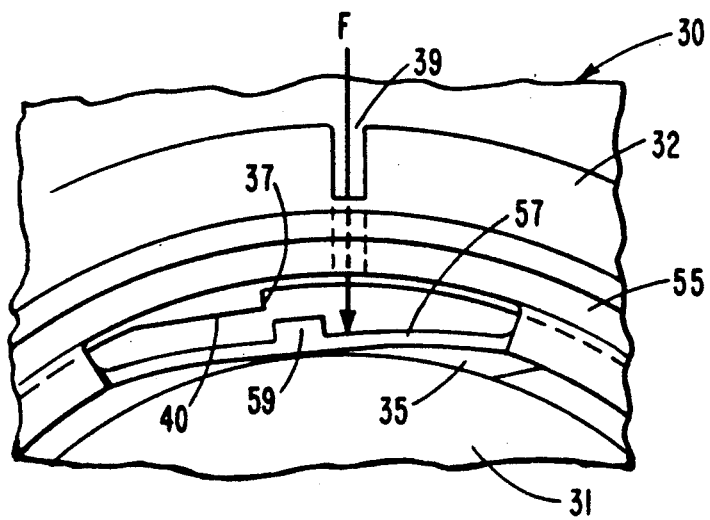
FIG. 5 is an enlarged sectional view of the swivel ring locking mechanism showing it in the unlocked position.

FIG. 4, shows the swivel ring 50 located in the groove 33, with projection 59 against stop 37. For projection 59 to clear stop 37 a force F is applied, as shown in FIGS. 5 and 7, with a slender rod or the like through an opening 39 in the collar 32 to the flexible section 57 to move the flexible section 57 away from swivel stop 37. The swivel ring 50 can then be rotated counter clockwise until projection 59 encounters stop 38. To allow the flexible section 57 to move back sufficiently, such that projection 59 is able to clear stop 37, a portion of groove 33 associated with surface 35 and located generally opposite the opening 39 and stop 37 is enlarged.

Figures 10, 12:
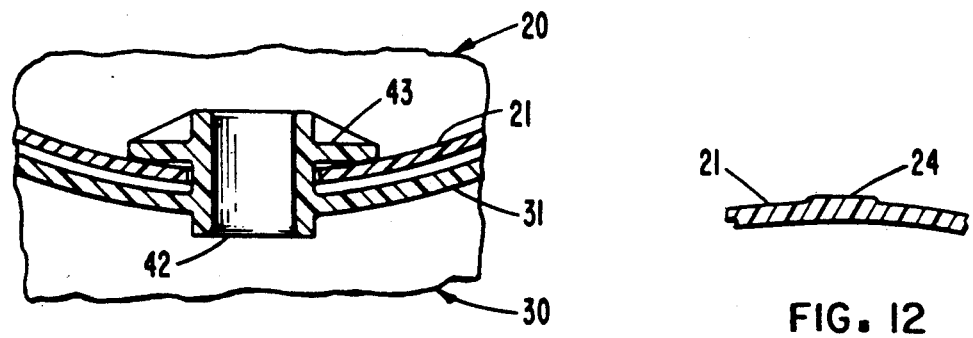
FIG. 10 is a partial, cross-sectional view of the key and lock arrangement taken along line 10—10 of FIG. 6.
FIG. 12 is a partial, cross-sectional view of the embodiment taken along line 12—12 of FIG. 11.
Figure 11:
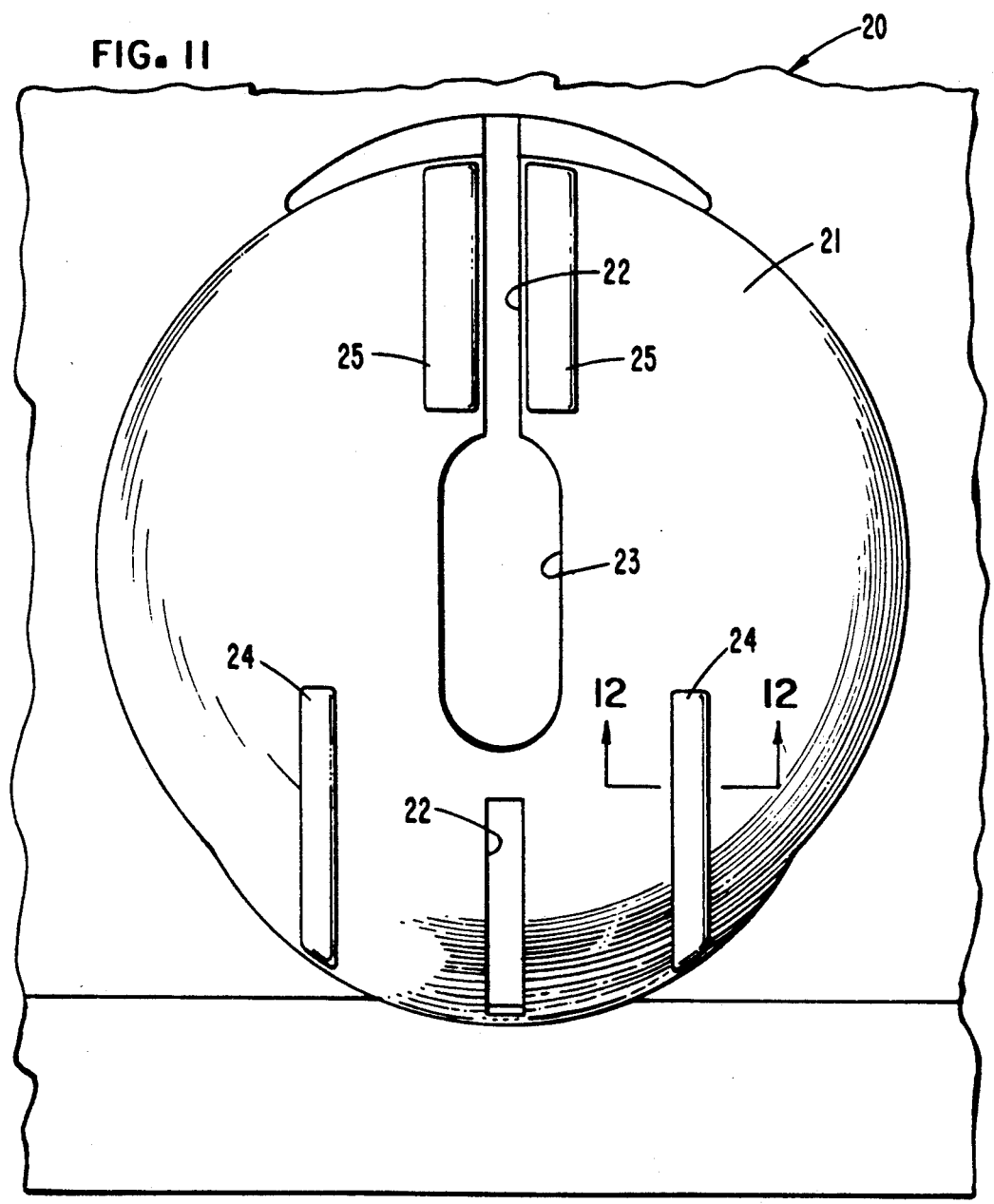
FIG. 11 is a partial bottom plan view of the display monitor illustrating an alternative implementation of the spherical surface extending from its bottom portion.

Extending upwardly from the center of socket 31 and integral therewith is a T-shaped key made up of leg 42 and a foot 43. A cross-sectional view of the key is shown in FIG. 10. The foot 43 is oriented so it is substantially parallel to the X axis of the base 30 as illustrated in FIGS. 2, 3, and 4 of the drawing. The T-shaped key is arranged for communicating with a lock slot 23 located in the bottom of the spherical surface 21, as shown in FIG. 11. Lock slot 23 is oriented substantially parallel to the Z axis of the monitor 20. The width of the lock slot 23 is slightly larger than that the width of the foot 43, such that the foot 43 can enter the slot 23 when the two are aligned. Once foot 43 passes through the lock slot 23, any misalignment between the two prevents the foot 43 from coming out of the slot 23. Lock slot 23 permits foot 43 to freely slide within the length of the slot wherein the length of the slot 23 limits the extent of tilt angle of the monitor 20.

For an understanding of the apparatus relative to the mounting and dismounting of monitor 20 on base 30, reference is made to FIG. 1. As the first step in mounting monitor 20, the friction ring 60 and the swivel ring 50 are placed in groove 33, with the projection 59 of the swivel ring 50 against stop 38. Following, the monitor 20 is placed over base 30, with the spherical surface 21 lining up with socket 31, and the monitor 20 rotated 90 degrees counter clockwise from X axis of the base 30. These actions line up foot 43 with lock slot 23 and projections 56 of the swivel ring 50 with respective slots 22 in the spherical surface 21. The monitor 20 may then be lowered on top of base 30 such that spherical surface 21 enters the cavity formed of spherical surface 31, foot 43 enters and passes through slot 23 and projections 56 enter their respective slots 22. As shown in FIG. 7, the spherical surface 21 is engaged by the bevel surface 55, leaving a clearance between the spherical surface 21 and the socket 31. The monitor 20 is then rotated clockwise, and since projections 56 are engaged by slots 22, the swivel ring 50 rotates with the monitor 20. During this rotation projection 59 will encounter a camming surface 40, pushing projection 59 towards the center of the ring 50 and deflecting its flexible section 57 until projection 59 snaps into the recessed area of groove 33 defined by swivel stops 36 and 37.

Removal of the monitor 20 from the base 30 is accomplished by rotating the monitor 20 counterclockwise until projection 59 comes up against the stop 37; unlocking the swivel ring 50 in a manner disclosed previously utilizing the access opening 39 located in the collar 32; and continuing with the counterclockwise rotation until projection 59 encounters the stop 38 at which point foot 43 is aligned with the lock slot 23 allowing the monitor 20 to be lifted off the base 30.

In an alternative implementation of the spherical surface 21, as shown in FIG. 11, the spherical surface 21 of monitor 20 includes raised, spherically contoured areas 24 and 25 for mating with the beveled surface 55 of the swivel ring 50. The raised areas 24 and 25 provide a basically three point support to the monitor 20 and reduce or eliminate any instability between the monitor 20 and the base 30 which may be caused by imperfections in the spherical surface 21 and the beveled surface 55. With the spherical surface 21 having a diameter of approximately 12.5 inches, it was determined experimentally that to ensure sufficient wear areas, the width of each raised area 24 was to be approximately 0.3 inch and the width of each raised area 25 approximately 0.5 inch. It was also determined experimentally that textured surfaces on the raised areas 24 and 25 ensured a smoother tilting action and substantially eliminated lock-up between the mating surfaces.

I claim:

1. Apparatus for mounting a display monitor and for permitting and limiting the extent of tilting and swiveling of the monitor, said apparatus comprising:
   a projection extending downwardly from the bottom surface of the monitor forming a convex spherically contoured surface with said spherically contoured surface having a pair of elongated slots located in predetermined locations at opposite sides thereof;
   a support structure for the monitor having a cavity for accommodating said spherically contoured surface with said cavity surrounded by a collar having an annular groove therein;
   a swivel ring located in said annular groove and arranged for rotation therein with said swivel ring having a beveled top surface for mating with said spherically contoured surface;
   a pair of projections extending from a top surface of said swivel ring with each projection engaging its respective slot in the spherically contoured surface and wherein said projections slide within the slots permitting tilting of the monitor by allowing relative motion between the spherically contoured surface of the monitor and the beveled surface of said swivel ring and wherein said projections force said swivel ring to rotate with said spherically contoured surface during swiveling of the monitor and not allowing relative respectively swiveling motion between said spherically contoured and beveled surfaces.

2. Apparatus in accordance with claim 1, wherein said spherically contoured surface is formed by at least three raised areas of perdetermined width and height located on said projection extending from the bottom surface of the monitor.

3. Apparatus in accordance with claim 1, wherein said base support structure has a key means extending upwardly from the cavity and wherein said surface has a lock adapted to be engaged by said key means for limiting the spherically contoured extent of tilting of said monitor.

4. Apparatus in accordance with claim 3, wherein said key means and lock are structured to be in non-locking engagement when the monitor is positioned at a predetermined mount/dismount position with respect to said support structure.

5. Apparatus in accordance with claim 4, wherein said key means and lock are structured to be in a locking engagement when the monitor is tilted or swiveled from said mount/dismount position.

6. Apparatus in accordance with claim 1, further including a friction ring located in said annular groove underneath and in contact with said swivel ring.

7. Apparatus in accordance with claim 1, wherein said swivel ring has a tooth extending from one side of said swivel ring towards a side of said annular groove having first and second spaced-apart projections extending from said annular groove wherein said projections are arranged to engage said tooth for limiting the extent of rotation of said swivel ring between said two spaced-apart projections.

8. Apparatus in accordance with claim 7, wherein said swivel ring has a flexible section and said tooth is located on said flexible section.

9. Apparatus in accordance with claim 8, wherein said collar has an opening therein allowing application of a force to said flexible section for moving said flexible section such that said tooth is able to rotate past said first projection.

10. Apparatus in accordance with claim 9, wherein said annular groove has a third projection extending from its side with said third projection arranged to engage said tooth for positioning the monitor in the mount/dismount position.

11. Apparatus for mounting a display monitor and for permitting and limiting the extent of tilting and swiveling of the monitor, said apparatus comprising:
    a projection extending downwardly from a bottom surface of the monitor forming a convex spherically contoured surface;
    a support structure for the monitor having a cavity for accommodating said spherically contoured surface with said cavity surrounded by a collar having an annular groove therein wherein said annular groove has a flat surface;
    a friction ring located in said annular groove with a bottom surface thereof positioned on said flat surface of said annular groove and movable with respect to said annular groove flat surface;
    a swivel ring located in said annular groove on a top surface of said friction ring and arranged for rotation within said annular groove and with respect to said friction ring with said friction ring controlling magnitude of swiveling of the monitor and wherein said swivel ring has a beveled top surface for mating with said spherically contoured surface; and
    means for allowing relative motion between said spherically contoured and beveled surfaces during a tilting of the monitor and for preventing said relative respectively, swiveling motion during a swiveling of the monitor.

* * * * *